Sept. 20, 1955      G. G. BINDER, JR      2,718,262
SECONDARY OIL RECOVERY BY SELF-PROPELLED SOLVENT EXTRACTION
Filed Jan. 29, 1952
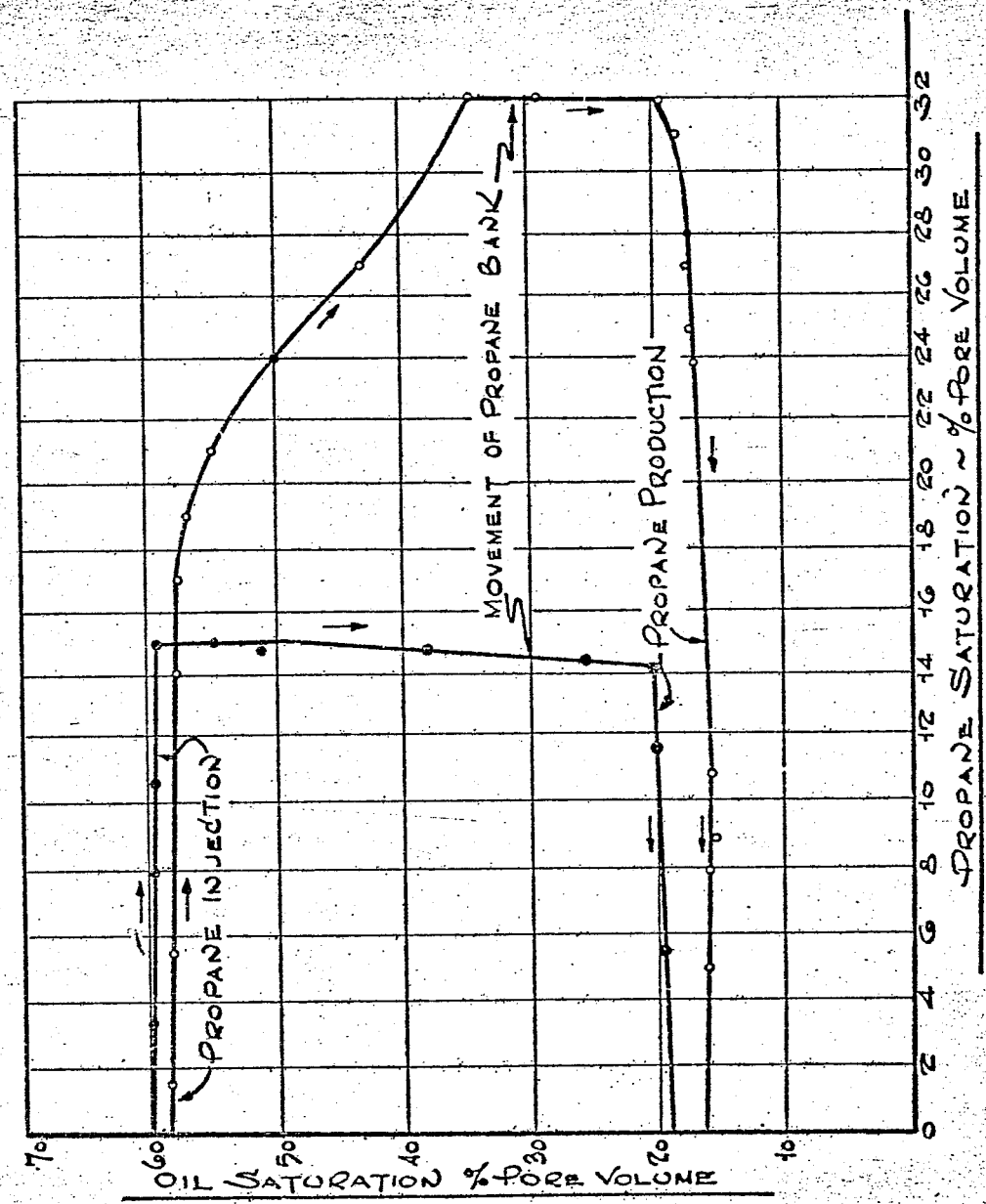
George G. Binder Jr. Inventor
By W. D. T Hilman Attorney

United States Patent Office 2,718,262
Patented Sept. 20, 1955

2,718,262

SECONDARY OIL RECOVERY BY SELF-PROPELLED SOLVENT EXTRACTION

George G. Binder, Jr., Tulsa, Okla., assignor to Esso Research and Engineering Company, a corporation of Delaware Application January 29, 1952, Serial No. 268,866

3 Claims. (Cl. 166—9)

This invention concerns a novel process for improving the recovery of petroleum from underground oil formations. The invention concerns a technique of secondary recovery in which a limited volume of a liquefied, normally gaseous, hydrocarbon is injected into an oil-bearing stratum penetrated by oil wells from which production of oil has been seriously depleted. After injection of the body of liquid hydrocarbon, the injection well through which the hydrocarbon is introduced to the formation is closed off. Thereafter, the hydrocarbon is permitted to vaporize in the formation in a manner to drive oil through the formation to the producing wells referred to without necessity for providing any extraneous driving force. The process is thus a secondary recovery method in which a bank of solvent is moved through an oil reservoir to promote oil production under the influence of the propelling force of the vapor pressure of the injected solvent.

In the production of petroleum oil from oil-bearing formations of the earth, the first phase of production activity is carried out by so-called "primary" production methods. During this phase of production, the energy of the reservoir is relied upon to cause production of oil from producing wells. It is sometimes stated that about one-third of the total available oil in a formation is commonly recovered by primary production methods.

In the attempt to recover greater portions of the available oil in oil-bearing formation, "secondary recovery" methods have been suggested. Secondary recovery methods are designed to augment the remaining reservoir energy after depletion by primary recovery techniques. More explicitly, by way of definition, a secondary recovery method requires the introduction of fluid through an injection well which provides fluid access to an oil-bearing stratum penetrated by one or more producing wells. By injecting fluid in this manner, it is possible to force oil through the oil-bearing stratum so as to increase the ultimate oil recovery from producing wells. For some time, water flooding has been one of the practical applications of the principles of secondary recovery.

Presently known secondary recovery techniques however leave much to be desired. It is generally appreciated that even as best applied, presently known secondary recovery methods are not operative to permit complete recovery of oil from an oil-bearing formation. In this connection, as a rule of thumb, it has been stated that when primary production methods produce about one-third of the available oil, secondary production methods will permit recovery of an additional one-third of the oil. Hence, about one-third of the total oil present generally remains in the reservoir and is not recovered by presently employed production methods.

Again, a characteristic of present secondary recovery methods is the inherent expense of these methods. In this connection, it is apparent that the cost of providing apparatus to inject large volumes of fluid into a producing formation, necessitating extensive fluid treating and pumping installations, offsets to a considerable degree the value of the oil recovered thereby. As a practical matter, this limitation requires termination of secondary recovery techniques when oil production becomes uneconomic; at a time well prior to complete recovery of oil from a given reservoir.

It is therefore the principal object of this invention to provide an improved technique of secondary recovery permitting greater ultimate recovery of oil on an economical basis. This is achieved by utilizing a limited volume of liquefied, normally gaseous, hydrocarbons; the volume employed is a minor portion of the total hydrocarbon pore volume of the reservoir treated. The process is conducted so as to permit utilization of the vapor pressure of this limited volume of liquid hydrocarbons as a driving force for the production of oil.

In accordance with this invention, therefore, a limited amount of a liquefied hydrocarbon is injected into an oil-bearing formation. The volume of the liquefied hydrocarbon required ranges from about 10 to 30% of the total pore volume in the formation to be affected by the solvent injection. Injection is to be carried out in a manner to provide introduction into the formation of substantially all of this volume of solvent in liquid form. Towards this end, high injection pressures and injection rates are required.

The hydrocarbon to be employed as a solvent may broadly be any readily liquefied normally gaseous hydrocarbon providing a substantial vapor pressure at the temperatures ordinarily encountered in an oil-bearing formation. These temperatures are generally in the range of about 100 to 250° F. although temperatures outside this range may be encountered. In particular, therefore, the hydrocarbon which may be employed may constitute a hydrocarbon having from two to five carbon atoms. For a variety of reasons, however, propane is the hydrocarbon best adapted for utilization in the process of this invention, and reference will particularly be made hereinafter to the use of propane.

By injecting propane into an oil-bearing formation at a pressure in excess of its vapor pressure at the reservoir conditions, for example, about 500 pounds per square inch, it is possible to secure sufficiently rapid penetration of the propane into the formation so as to permit little vaporization of the liquefied propane. Consequently, it is practical to introduce the requisite volume of liquefied propane into an oil-bearing formation so as to provide the propane in liquid form in oil-bearing strata adjacent the injection well. Thereafter, it is only necessary to close off the injection well and to carry out normal producing techniques at producing wells penetrating the oil-bearing strata into which the propane has been injected.

Any desired pattern of producing and injection wells may be employed in the practice of this invention. Thus, for example, the so-called five-spot pattern may be employed, if desired. This pattern is such that four producing wells are equally spaced about a single injection well. Consequently, in an area containing wells so spaced, it may be considered that four injection wells encompass each producing well or conversely, that four producing wells encompass each injection well. This or other of the generally employed patterns of wells in secondary recovery techniques may be used. Again, it may be emphasized that the spacing of the wells may follow the general practice.

The bank of liquid propane existing in the formation adjacent the injection well is operative to cause oil production in the following manner: A concentration gradient may be considered to exist between the liquid propane and oil contained in the pores of the reservoir. This gradient tends to advance through the oil so as to drive the oil before it towards the producing wells. As the process continues, vaporization of a portion of the original body of liquid propane will occur to occupy a volume equivalent to the displaced oil. The original body of liquid solvent provided is such that only a small portion of the original solvent body need be vaporized to fill the pore space of the swept-out portion of the reservoir. The advance of the propane-oil concentration gradient referred to is accompanied by an increasingly high oil concentration in the propane-oil mixture. As a result, the partial pressure of the propane gradually decreases.

These principles can well be understood by reference to a typical reservoir condition. Let it be assumed that a given oil reservoir is at a temperature of about 120° F. The vapor pressure of propane at this temperature is about 240 pounds per square inch absolute. Consequently, if the producing wells are being pumped, the pressure drop available to act as a driving force is 225 pounds per square inch. As the oil drive proceeds and the available drive pressure drops as indicated, the drop in driving pressure which occurs as oil is swept by the propane is offset in large part by the decreasing length of the portion of the reservoir containing flowing liquid. Thus, the full pressure originally applied is available after the initial injection when it is necessary to drive oil over the complete distance between an injection well and a producing well. When the process has continued so that oil has been swept from an appreciable portion of the reservoir, the resulting diminution of the partial pressure of the propane is offset by the correspondingly shorter length of travel required. In the particular case referred to, there would be a 13 fold increase in the volume of propane by the conversion of liquid propane to gaseous propane at its vapor pressure. Consequently, it may be seen that if 0.20 hydrocarbon pore volumes of propane were initially injected into the reservoir, vaporization of 37.5% of the original bank of propane would be sufficient to fill the entire formation with propane gas at its vapor pressure of 240 pounds per square inch absolute. Consequently, it may be appreciated that injection of the stated proportion of liquid propane provides adequate driving force, depending upon the partial vaporization of the propane, to secure effective oil recovery.

As brought out, therefore, the general mechanism of secondary recovery in the process of this invention depends upon the vaporization of a portion of a body of liquid propane which is injected into a formation. This vaporization occurs so as to substantially maintain the initial vapor pressure of the propane throughout the recovery operation which acts as a driving force in the sweeping of oil through the reservoir to producing wells. It is apparent that after recovery of oil by this technique, continued operation of the producing wells may be carried out so as to recover a substantial portion of the propane originally introduced. If desired, after the completion of oil recovery, nitrogen, water or other driving fluid may be introduced through the injection well so as to force and permit recovery of the propane in the reservoir. This is particularly attractive since the propane may be produced and recovered as an essentially uncontaminated gas. It is therefore relatively simple to repressure the propane gas and to cool it for liquefaction and reuse in secondary recovery operations.

The nature of this invention may be appreciated by reference to the attached drawing which graphically indicates the operation of two secondary recovery operations conducted in accordance with this invention.

In order to evaluate the operability and advantages of the present invention, experiments were conducted in a manner to simulate field conditions. In these experiments, a 4-foot core was prepared consisting of consolidated sand. A phenol-formaldehyde plastic was used to consolidate the sand so as to provide a core closely corresponding in physical properties to a sand formation of the nature providing an oil reservoir. In work of this character it has been established that a core of this nature accurately simulates actual conditions of porosity and permeability. The core is so prepared, for example, that the plastic employed in consolidation assumes the position of connate water. This core was then arranged so as to permit driving fluids completely through the core with provision for periodically determining the nature and concentration of fluids present in the core and for determining the volume and nature of fluids passing through the core. The equipment was so arranged as to permit applying fluid at a desired pressure at one end of the core and to permit release and recovery of fluids from the opposite end of the core at any desired pressure. The core was two inches in diameter and was sealed in a steel tube during these operations.

In a first step of the procedure, the core was saturated with a hydrocarbon oil. In the particular experiments to be described, normal decane was employed. Nitrogen gas was then blown through the core so as to decrease the oil saturation to a value of 60% of the total pore volume. The core was thus placed in a condition simulating that to be expected in an oil-bearing formation partially depleted of oil by primary recovery methods. Thereafter, application of the process of this invention was initiated.

Liquid propane was injected to the core at a pressure of 300 pounds per square inch. In one operation, the amount of propane injected was equal to 15% of the pore volume of the core, while in another operation the amount of propane injected amounted to 32% of the total pore volume of the core. During injection of the propane and thereafter, the fluid produced from the opposite end of the core was recovered and analyzed. By repetitious analyses conducted during the operation, determinations were periodically made as to the total oil saturation of the core and as to the gas saturation. During these operations, the temperature was maintained at about 75° F. so that the available pressure for driving oil through the core was about 130 pounds per square inch—the vapor pressure of propane at this temperature. The results of these operations are represented in the attached drawing in which the oil saturation of the core is plotted against the propane saturation of the core, each expressed as a percent of the total pore volume of the core.

Referring first to the operation indicated by solid circles, it may be noted that the progress of the operation may be followed on the graph by moving along the line shown in the direction of the arrows provided. Thus, starting at the upper left-hand portion of the drawing, the core originally contained about 62 pore volume percent of oil and consequently about 38 pore volume percent of gas. Propane was injected as shown by the values of the abscissa until 15 pore volume percent of liquid propane had been introduced. During this period of propane injection, it will be observed that the volume percent of oil contained in the core did not change appreciably. Consequently, during this period, injection of the propane did not cause oil production but was effective to force the original gas, in part, from the core. After the injection of liquid propane, the core was sealed off at the end of the core at which the propane was injected. Subsequently, as indicated in the graph, this body of liquid propane was effective in forcing oil from the core. Thus, it will be observed that the oil saturation of the core progressively dropped from 62 pore volume percent to an ultimate figure of about 18 pore volume percent. It will also be observed that during this period of oil production, little propane was produced with the oil since the propane saturation only changed from a value of about 15 pore volume percent to about 14 pore volume percent.

At a later phase in the recovery operation, oil recovery substantially ceased and substantially pure propane was obtained from the core. Thus, as shown by the lowermost portion of the graphical line referred to, in the last phase of the operation, oil saturation remained substantially constant at a value of about 20 pore volume percent while the propane saturation changed from about 14 percent to substantially nil.

This operation therefore demonstrates the manner in which a self-propelled propane drive can operate. In a first phase of the operation, about 10 to 30 pore volume percent of liquid propane is injected, forcing from a reservoir a small portion of the gas which may be present, but with substantially no oil production. Thereafter, as diffusional and capillary processes occur, movement of the liquid propane under the driving force of its own vapor pressure causes production of oil with substantially no production of propane. This is effective to drive a major portion of the oil present in the reservoir towards producing wells. Finally, after some limiting value of oil recovery is attained, substantially pure propane may be recovered, again driven by the vapor pressure of the propane.

Since the process of this invention depends in part upon diffusion, some improvement in recovery is obtainable by lengthening the time of operation. In an operation to demonstrate this effect, a back pressure of 90 pounds per square inch was maintained on the core referred to so as to lengthen the period of oil recovery. This pressure was gradually dropped. It was found that improvement in oil recovery of about 2.5% was obtainable. This factor must be considered therefore in conjunction with the fact that in actual operation, in spite of a somewhat greater vapor pressure, much greater distances and consequently much longer times are involved.

Referring now to the operation represented by the open circles of the drawing, an operation is graphically presented in which 32 pore volume percent of propane was employed. In this case, it will be observed, from the gradually downwardly sloping line, that prior to completion of liquid propane injection, oil production had been initiated. Again, however, after completion of propane injection, oil production was achieved with substantially no propane production. Finally, the operation terminated in a final phase of operation in which substantially pure propane recovery was obtained with little additional oil recovery. The ultimate oil recovery amounted to about 46 pore volume percent leaving a residual oil content of about 16 pore volume percent.

As exemplified by these examples therefore, the process of this invention is particularly adapted for economical, effective secondary recovery operations. In the practice of this invention, it is particularly contemplated that sufficient propane be injected at an injection well so as to provide a minor fraction of the total pore volume of a reservoir affected by an injection well. Thereafter, by sealing off the injection well so as to maintain the vapor pressure of the propane, and by carrying out normal production operations from the producing wells, effective recovery of oil may be achieved. As demonstrated, the oil will be recovered substantially uncontaminated with propane gas during the principal portion of production. It is only after oil has been driven from the reservoir to provide an economically practical maximum of oil recovery that propane in any substantial volumes will be produced. This propane may then be recovered in substantially pure form, facilitating repressurizing and re-injection of the propane as desired.

What is claimed is:

1. A process for the secondary recovery of petroleum oil from an oil-bearing formation penetrated by a first well hereinafter referred to as a production well and a second well hereinafter referred to as an injection well which comprises the steps of: injecting about 10 to 30 pore volume percent of a liquefied normally gaseous $C_2$ to $C_5$ hydrocarbon into the reservoir through the said injection well whereby a bank of liquid phase hydrocarbon material will exist in the said formation adjacent the injection well, thereafter discontinuing the injection of said liquefied hydrocarbon, sealing said injection well to prevent release of hydrocarbon material therefrom, and maintaining a pressure at the said production well and the adjacent formation at a level to permit vaporization of the said liquefied hydrocarbon at the temperature of the formation, and withdrawing fluid from said production well.

2. A process for the secondary recovery of petroleum oil from an oil-bearing formation penetrated by a first well hereinafter referred to as a production well and a second well hereinafter referred to as an injection well which comprises the steps of: injecting about 10 to 30 pore volume percent of a liquefied normally gaseous $C_2$ to $C_5$ hydrocarbon into the reservoir through the said injection well whereby a bank of liquid phase hydrocarbon material will exist in the said formation adjacent the injection well, thereafter discontinuing the injection of said liquefied hydrocarbon, sealing said injection well to prevent release of hydrocarbon material therefrom, and maintaining a pressure at the said production well and the adjacent formation at a level to permit vaporization of the said liquefied hydrocarbon at the temperature of the formation, withdrawing petroleum oil from said production well until substantial proportions of the said $C_2$ to $C_5$ hydrocarbon reaches the production well, thereafter injecting an inert fluid at the said injection well and recovering the said $C_2$ to $C_5$ hydrocarbon from the production well.

3. A process as defined by claim 1 wherein said liquefied normally gaseous hydrocarbon comprises propane.

References Cited in the file of this patent

UNITED STATES PATENTS

| | | |
|---|---|---|
| 1,101,605 | Wright | June 30, 1914 |
| 2,308,414 | Campbell | Jan. 12, 1943 |
| 2,412,765 | Buddrus et al. | Dec. 17, 1946 |
| 2,582,148 | Nelly, Jr. | Jan. 8, 1952 |
| 2,609,051 | Brownscombe | Sept. 2, 1952 |